(12) United States Patent
Morningstar

(10) Patent No.: US 6,373,437 B1
(45) Date of Patent: Apr. 16, 2002

(54) COMMUNICATION DEVICE HAVING LINKED MICROPHONE AND ANTENNA COMMUNICATION OF CONTENT TO END USERS

(75) Inventor: Paul Morningstar, North Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/730,883

(22) Filed: Dec. 7, 2000

(51) Int. Cl.[7] .................................................. H01Q 1/32
(52) U.S. Cl. .......................................... 343/702; 455/90
(58) Field of Search .................................. 343/702, 720, 343/791, 904, 905, 906; 455/90

(56) References Cited

U.S. PATENT DOCUMENTS 3,838,429 A * 9/1974 Reggia ........................ 343/750
4,641,317 A * 2/1987 Fullerton ........................ 375/1

* cited by examiner

*Primary Examiner*—Don Wong
*Assistant Examiner*—James Clinger
(74) *Attorney, Agent, or Firm*—Andrew S. Fuller

(57) ABSTRACT

A communication device (10) couples a microphone (12) to a modulator (22) that modulates a microphone signal via a transmission medium (14) having an antenna element (18) for radiating the modulated electromagnetic signal. The communication device also has a housing (36) incorporating device circuitry that is linked to the microphone (12) via the transmission medium (14).

14 Claims, 3 Drawing Sheets

COMMUNICATION DEVICE HAVING LINKED MICROPHONE AND ANTENNA COMMUNICATION OF CONTENT TO END USERS

FIELD OF THE INVENTION

The present invention generally relates to the field of communication systems, and more particularly to communicating voice signals received at a microphone via an antenna.

BACKGROUND OF THE INVENTION

Wireless communication devices that communicate voice over a radio frequency channel via an antenna are known. Examples of such devices are cellular phones, and two-way radios which are portable communication devices that provide for transmission and reception of voice signals. Portable communication devices have a housing which enclose various analog, digital and radio frequency (RF) circuitry that facilitate the reception and transmission of the voice signals over an RF channel.

The portable communication device incorporates a microphone and a speaker that are used for voice communication. As is well known, the microphone converts a voice signal into a corresponding electrical signal that is processed by the device circuitry and then modulated for generating a communications signal for transmission via the antenna. The antenna also receives a voice modulated signal which is then demodulated in the receiver to produce a voice signal that is applied to the speaker to make the voice signal audible.

In some handheld communication devices, the speaker and microphone are disposed on the same housing, for example, on opposite ends of the device. In operation, the communication device is held with the speaker being near a user's ear while the user speaks into the microphone. Usually, the antenna projects from the top of the housing to facilitate the transmission and reception of the communications signals. Due to the small size of the housing, some users may experience difficulty due to misalignment of the microphone and speaker with user's mouth and ear. For example, when the speaker is held near the ear, the microphone may be mis-aligned with the mouth. Conversely, when the microphone is properly aligned with the mouth, the speaker may be mis-aligned with the ear. Thus, it may be inconvenient to a user to listen to the speaker and speak into the microphone at the same time.

Known headset devices allow projected sound to be heard through one or two speakers that are disposed within one or two ear-pieces covering one or both ears. The headset has a wearable earpiece housing that can be linked to a microphone that extends to rest in front of the mouth. For wireless communication of voice, some headsets include an antenna positioned on the earpiece. Another known wearable communication device can be worn around the wrist, with the wristband acting as an antenna.

One of the disadvantages associated with conventional communication devices is poor antenna transmission and reception, which is mainly due to the user's body blocking or obstructing emission of electromagnetic energy via the antenna. This is especially true when the antenna has an antenna element that provides an emission pattern that is radiated from a focused point of radiation.

Therefore, there exists a need for a small and easy to use communication device that allows for efficient signal communication via the antenna, while offering a practical interface for the transmission and reception of voice signals.

DETAILED DESCRIPTION OF THE INVENTION

The present invention relates to a portable communication device, for example, a portable handheld device or a headset, which combines an antenna and a microphone for voice communications. The microphone produces a microphone signal corresponding to a received acoustic or sound wave representing a user's voice. The microphone signal is applied to a modulator that modulates the microphone signal for generating a modulated electromagnetic signal, for example, a modulated RF signal at a specified frequency channel. A transmission medium includes an antenna element for radiating the electromagnetic communication signal. In one embodiment in accordance with the present invention, the transmission medium, can utilize a coaxial or stripline arrangement, which includes an inner conductive element, or inner conductor, and an outer conductive element, or outer conductor. The outer conductive element can radiate as a monopole antenna that provides scattered emission of electromagnetic energy, or can be a component of an antenna assembly. The outer conductive element also provides shielding to the inner conductor, thereby minimizing spurious radiation from the inner conductive element. The outer conductive element can alternately be a component of an antenna assembly.

According to the invention, the transmission medium, which includes the antenna element, couples the microphone signal to the modulator for generating the modulated communication signal. More specifically, the microphone has a transducer element that is terminated by the inner conductive element and outer conductive element that couples the microphone signal to the modulator. According to one of the more detailed features of the present invention, the communication device includes a housing, either a handheld housing or a headset housing, which is linked to the microphone via the transmission medium, which also includes the antenna element. Additionally, the communication device can include a speaker disposed within the housing. A demodulator demodulates a electromagnetic communications signal received at the antenna element for generating a speaker signal that is applied to the speaker.

Figure 1:
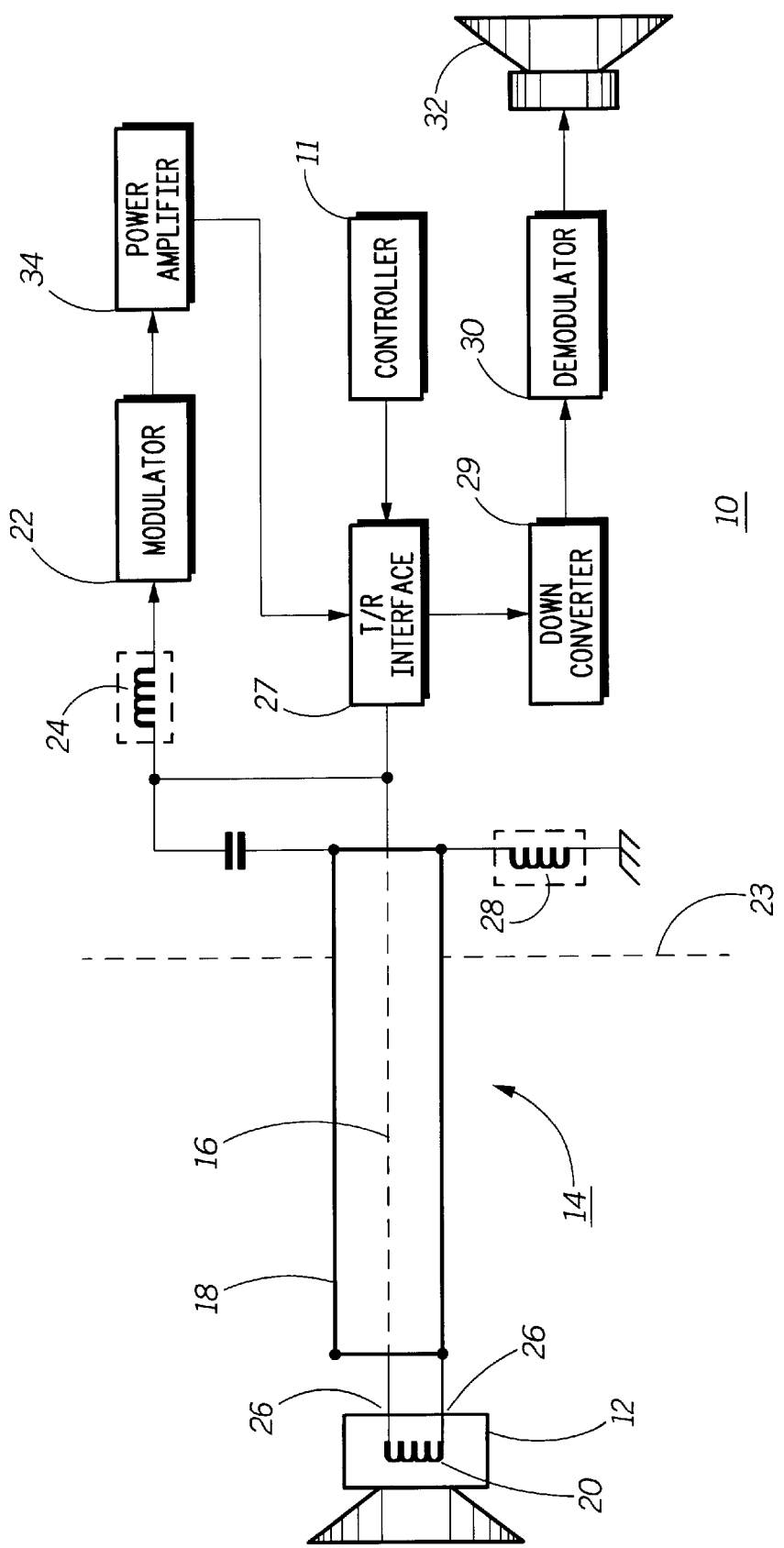
FIG. 1 is an electrical block diagram of diagram of portable communication device in accordance with the present invention.

Referring to FIG. 1, a block diagram of a portable communication device 10 that incorporates the present invention is shown. In the preferred embodiment, the portable communication device 10 is a portable two-way device that under the control of a controller 11 operates in transmit and receive modes for communicating voice over one or more RF channels. In one exemplary embodiment, the communication device 10 can be operating within a communication system (not shown) that provides a voice service within a coverage area (not shown). A wide range of communication systems can employ the communication device of the present invention, including digital and analog cellular or land mobile systems, such as, AMPS, D-AMPS, GSM, IS-95, IS-136, Bluetooth, etc. Within any one of these systems, one user can use the communication device of the present invention to establish voice communications with another user. The controller 11 executes a programmed code to control the overall operation of the communication device, including receiving and transmitting control information with the communication system.

As shown in FIG. 1, the communication device 10 includes a microphone 12 that produces a microphone signal that corresponds to the user's voice. A transmission medium 14 (also known as transmission line) is coupled to the microphone 12. As shown, the transmission medium 14 can be a flexible coaxial cable or a stripline, which includes an inner conductive element 16 and an outer conductive element 18. Under this arrangement, an antenna element is formed by the outer conductive element 18 of the transmission medium 14, and enables receiving or radiating modulated electromagnetic communication signals. The microphone 12 includes a transducer element 20 which is terminated by the inner conductive element 16 and outer conductive element 18 for coupling the microphone 12 and its generated signal to a modulator 22. A matching circuit 24, comprising as shown an inductive element, couples the microphone signal to the modulator 22. It will be appreciated that the matching circuit 24 can also include suitably selected resistive and/or capacitive elements. As shown, the transducer element 20 has two terminals 26 that are coupled to the inner conductive element 16 and the outer conductive element 18.

As stated above, in addition to coupling the microphone 12 to the modulator 22, the outer conductive element 18 of the transmission medium 14 functions as a monopole whip antenna, preferably one-half wavelength long, upon which current distribution forms a standing wave. The monopole antenna acts as a part of a dipole antenna that has an approximate length of half wavelength, split at its electrical center that is coupled to the transmission medium 14. It will be appreciated that the length of the monopole whip antenna can be longer or shorter than one-half wavelength. The other part of the dipole is formed by its electrical image in an effective reference plane 23. Under this arrangement, the shielding provided by the outer conductive element 18 minimizes radiation from the inner conductive element 16, which in conventional antenna arrangements, is easily blocked by the body to cause degraded communication quality. Instead, the antenna element formed by the outer conductive element 18 in accordance with the present invention produces a scattered radiation field that is much less susceptible to obstruction or blockage.

In the transmit mode, the modulator 22 modulates the microphone signal using a specified modulation technique that includes mixing the microphone signal as a modulating signal for a specified frequency carrier. Examples of modulation techniques that can be used for modulating the microphone signal include, among other things, frequency, amplitude, or phase modulation, which can be implemented using well-known analog and/or digital signal processing techniques. The modulated microphone signal is applied to a power amplifier 34, to generate a modulated electromagnetic signal at a specified frequency or frequency spectrum. As is well known in the art, the modulating signal can be processed using frequency emphasis or de-emphasis processing as well as pre- or post-amplification, before being applied to the carrier frequency generator. Similarly, the output of the modulator 22 can be amplified in accordance with a desired application.

The generated electromagnetic signal is applied to the antenna element formed by the outer conductive element 18 via a transmit/receive (TX/RX) interface 27 through a well known matching circuit 28, such as an inductor as shown. For simplex communications applications, the TX/RX interface 27 can comprise a RF switch that selectively couples the antenna element formed by the outer conductive element 18 to a transmitter or receiver section. For duplex applications, the TX/RX interface 27 can comprise a duplexer that allows for simultaneous reception and transmission of communications signals via the antenna element formed by the outer conductive element 18.

In the receive mode, the communication device 10 receives a communications signal at the antenna element formed by the outer conductive element 18. The received communications signal is applied to a well-known down-converter 29 via the TX/RX interface 27. The down-converter 29 can for example, provide a baseband signal that is applied to a demodulator 30 that demodulates the received communications signal to recover a transmitted voice signal. The voice signal is applied to a speaker 32, which makes it audible to the user.

Figure 2:
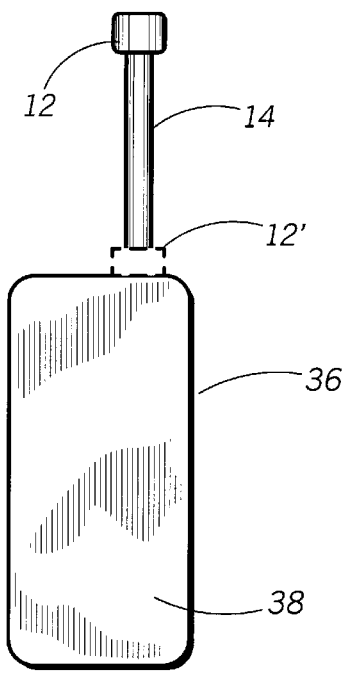
FIG. 2 is a first embodiment of the portable communication device of FIG. 1 in accordance with the present invention.
Figure 3:
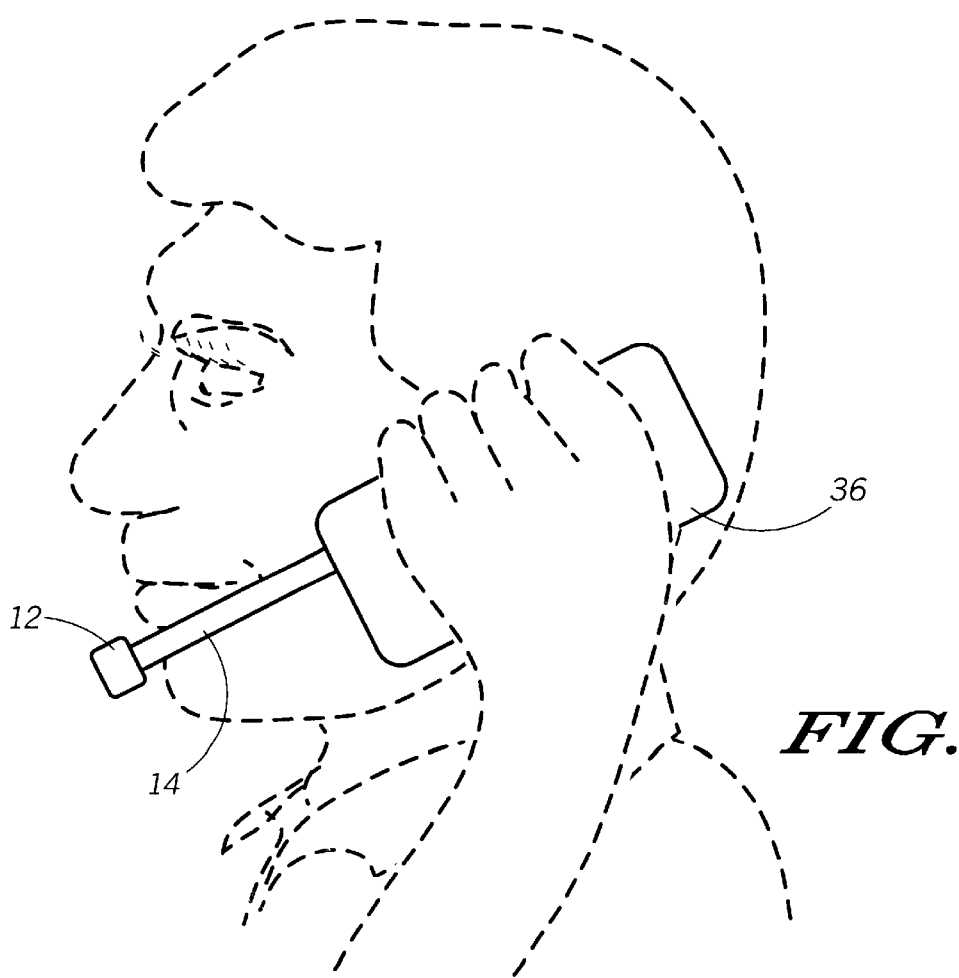
FIG. 3 is a diagram of the portable communication device according to FIG. 2 shown in use by a user.
Figure 4:
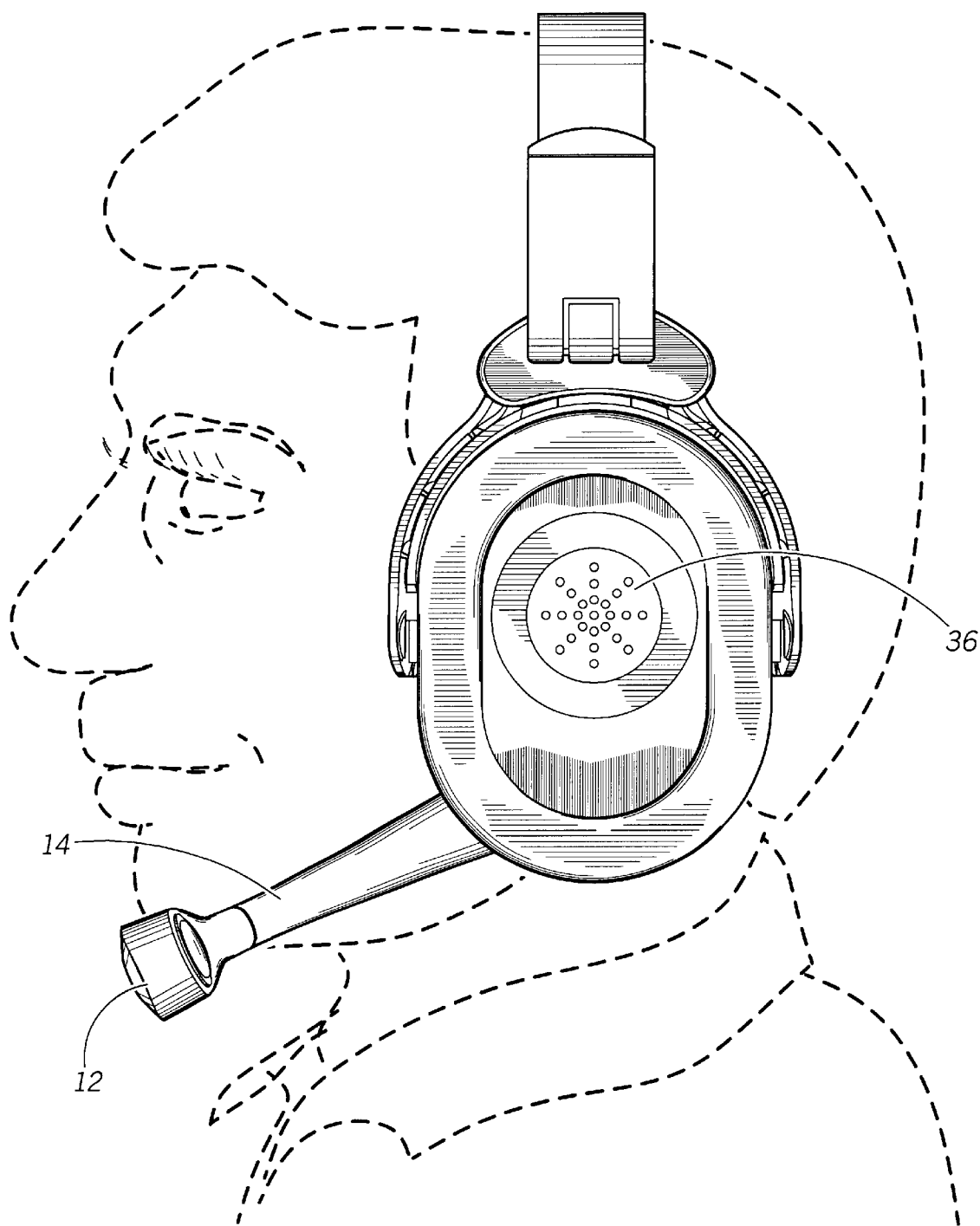
FIG. 4 is a second embodiment of the portable communication device of FIG. 1 shown in use by a user.

Referring to FIGS. 2 and 3 are diagrams illustrating a first embodiment of the portable communication device 10 in accordance with the present invention, and FIG. 4 is a diagram illustrating a second embodiment of the portable communication device 10 in accordance with the present invention. Refering to FIGS. 2 and 3, the portable communication device 10, is preferably a battery powered device (battery not shown), and includes a housing 36 that incorporates at least some of the device circuitry, e.g., modulator 22, demodulator 30, matching circuit 24, down-converter 29 and T/R interface 27, etc. The housing 36 for the communication device 10 of the present invention can be designed for a variety of applications. For example, the housing 36 can be arranged such that the portable communication device 10 is a handheld communication device, as shown in FIG. 2. In accordance with yet another feature of the present invention, a transmission medium 14 is used as a link to connect a microphone 12 to the housing 36, as shown in FIG. 2, where the transmission medium 14 provides a retractable antenna element which positions the microphone 12' adjacent to the housing 36. As stated above, the transmission medium 14 can be selected from a suitable flexible material, such as a semi-rigid coaxial cable, that facilitates the linking function of the microphone 12 to the housing 36. In this way, the present invention uses the link between the microphone 12 and housing 36 for radiating and receiving communications signals via the antenna element incorporated into the transmission medium 14, as shown in FIG. 3. As shown, in FIG. 4, the portable communication device 10 can be implemented as a headset and can be oriented with the ear of the user in such a way that the extension of the housing 36 and the transmission medium 14 positions the microphone 12 in relative alignment with the user's mouth.

Alternatively, the housing 36 can be a wearable headset housing, as shown in FIG. 5. In a headset arrangement, earpieces can be used to align one or two speakers with a user's ear, while the transmission medium 14 positions the microphone 12 in relative alignment with the user's mouth.

From the foregoing description it would be appreciated that the present invention provides a compact and reliable communication device for efficient communication of voice signals by coupling the microphone to the device circuitry via the antenna element disposed within the transmission medium. In addition, the present invention provides a comfortable arrangement for user interface with the communication device by linking the microphone to the housing via the transmission medium.

What is claimed is:

1. A communication device for transmitting and receiving voice communications comprising:
   a microphone for producing a microphone signal;
   a modulator for modulating the microphone signal for generating a modulated electromagnetic signal; and
   a transmission medium for coupling the microphone to the modulator, wherein the transmission medium comprises:
      an inner conductive element, and
      an outer conductive element, wherein the outer conductive element:
         couples the microphone to the modulator,
         forms an antenna element for transmitting voice communications including the modulated electromagnetic signal and for receiving voice communications, and
         provides radiation shielding to the inner conductive element.

2. The communication device of claim 1, wherein the antenna element is a monopole antenna.

3. The communication device of claim 1, wherein the microphone has a transducer element, and further wherein the transducer element is coupled to the inner conductive element and the outer conductive element.

4. The communication device of claim 3, wherein the transmission medium is a coaxial cable.

5. The communication device of claim 3, wherein the transmission medium is a stripline.

6. The communication device of claim 1 further including a housing, wherein the transmission medium is used as a link to connect the microphone to the housing for receiving and radiating communication signals via the antenna element incorporated within the transmission medium.

7. The communication device of claim 6, wherein the housing is a hanhheld housing.

8. The communication device of claim 6, wherein the housing is a headset housing, wherein the transmission medium positions the microphone in alignment with a user's mouth.

9. The communication device of claim 6 further including a speaker that is disposed within the housing and a demodulator that demodulates a received electromagnetic signal at the antenna element for generating a voice signal that is applied to the speaker.

10. The communication device of claim 6 wherein the transmission element provides a retractable antenna element which positions the microphone adjacent to the housing.

11. The communication device of claim 1, wherein the inner conductive element and outer conductive element are dielectrically separated from each other.

12. The communication device of claim 1 further comprising:
    a reference plane, wherein the antenna element is a dipole antenna formed by the outer conductive element and its electrical image in the reference plane.

13. The communication device of claim 1 wherein the antenna element produces a scattered radiation field.

14. A communication device having a transmit mode and a receive mode, the communication device comprising:
    a microphone for producing a microphone signal;
    a transmission medium, coupled to the microphone, wherein the transmission medium comprises:
       an inner conductive element, and
       an outer conductive element, wherein the outer conductive element forms an antenna element for transmitting and receiving voice communications, and further wherein the outer conductive element provides radiation shielding to the inner conductive element;
    a modulator coupled to the transmission medium; and
    a speaker coupled to the modulator for providing an audible voice signal to a user,
    wherein in the transmit mode, the modulator modulates the microphone signal received through the transmission medium thereby generating a modulated electromagnetic signal, and wherein the modulated electromagnetic signal is applied to the antenna element formed by the outer conductive element to transmit a first voice communication signal,
    and further wherein in the receive mode, the communication device receives a second voice communication signal at the antenna element formed by the outer conductive element and applies the received second voice communication signal to the speaker.

* * * * *